US011301734B2

(12) United States Patent
Qian et al.

(10) Patent No.: US 11,301,734 B2
(45) Date of Patent: Apr. 12, 2022

(54) OBJECT ASSOCIATION DETERMINATION (71) Applicant: Lenovo (Singapore) Pte. Ltd., Singapore (SG)

(72) Inventors: Ming Qian, Cary, NC (US); Song Wang, Cary, NC (US); Jian Li, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/647,930

(22) Filed: Jul. 12, 2017

(65) Prior Publication Data

US 2019/0019069 A1 Jan. 17, 2019

(51) Int. Cl.
*G06K 9/00* (2006.01)
*G06K 9/78* (2006.01)
*G02B 27/01* (2006.01)
*G06F 3/04845* (2022.01)
*G06F 16/583* (2019.01)
*G06F 3/01* (2006.01)

(52) U.S. Cl.
CPC ........... *G06K 9/78* (2013.01); *G02B 27/0172* (2013.01); *G06F 3/04845* (2013.01); *G06F 16/583* (2019.01); *G06K 9/00456* (2013.01); *G06K 9/00671* (2013.01); *G02B 2027/0138* (2013.01); *G02B 2027/0178* (2013.01); *G06F 3/011* (2013.01); *G06F 16/5838* (2019.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 8,589,413 B1 * | 11/2013 | Mohan | ............... | G06F 16/313 707/749 |
| 8,661,012 B1 * | 2/2014 | Baker | ............... | G06F 16/3338 707/706 |
| 9,979,809 B2 * | 5/2018 | Scavezze | .......... | H04M 1/72409 |
| 10,157,333 B1 * | 12/2018 | Wang | .............. | G06T 1/0007 |
| 2011/0212717 A1 * | 9/2011 | Rhoads | ............. | G06F 16/58 455/420 |
| 2014/0214547 A1 * | 7/2014 | Signorelli | .......... | G06Q 30/0267 705/14.64 |
| 2015/0309316 A1 * | 10/2015 | Osterhout | ............ | G06F 3/012 345/8 |

(Continued)

OTHER PUBLICATIONS

Civil Maps (Civil Maps Augmented Reality Maps & Localization, https://www.youtube.com/watch?v=s-hAWEDTxZU (Year: 2016).*

(Continued)

*Primary Examiner* — Randolph I Chu
(74) *Attorney, Agent, or Firm* — Ference & Associates LLC (57) ABSTRACT

One embodiment provides a method, including: receiving, at an information handling device, user command input comprising identification of an object; receiving, at an information handling device, image input comprising at least one object; determining, using a processor, whether the object in the user command input is associated with the at least one object in the image input; and responsive to determining that the object in the user command input is associated with the at least one object, performing a function based on the determination.

17 Claims, 3 Drawing Sheets

(56) References Cited

U.S. PATENT DOCUMENTS

| | | | | |
|---|---|---|---|---|
| 2016/0091964 | A1* | 3/2016 | Iyer | G02B 27/017 |
| | | | | 345/633 |
| 2017/0003933 | A1* | 1/2017 | Kobayashi | G06K 9/00671 |
| 2017/0286419 | A1* | 10/2017 | Tang | G06F 8/38 |
| 2017/0293611 | A1* | 10/2017 | Tu | G06F 3/0482 |
| 2017/0339340 | A1* | 11/2017 | De Bayser | H04N 5/23216 |
| 2018/0075659 | A1* | 3/2018 | Browy | G06F 1/1686 |
| 2018/0089895 | A1* | 3/2018 | Anderson | A63F 13/25 |
| 2018/0136465 | A1* | 5/2018 | Chi | G06F 3/0416 |
| 2018/0137551 | A1* | 5/2018 | Zheng | G06Q 30/0625 |
| 2018/0225290 | A1* | 8/2018 | Leppanen | G06F 16/54 |
| 2018/0367937 | A1* | 12/2018 | Asada | G10L 13/00 |
| 2019/0163437 | A1* | 5/2019 | Nagasaka | G10L 15/22 |
| 2020/0310532 | A1* | 10/2020 | Iyer | G06F 3/017 |

OTHER PUBLICATIONS

Layar AR (Layar—How to Use the Layar App, https://www.youtube.com/watch?v=bxSPb3htcrg (Year: 2014).*

Atheer One (7 Best AR Smart Glasses (Augmented Reality Smart Glasses, https://www.youtube.com/watch?v=0i4v0Texqco (Year: 2016).*

Google translate (https://www.youtube.com/watch? v=rh0DJwSznxw &list=PL590L5WQmH8duxGC2KkpCrehZRguas-rC, (Year: 2016).*

Guadarrama et al. Open Vocabulary Object Retriecal, Robotics Science and Systems RSS 2014 (Year: 2014).*

Visual Translator for HaloLens, Microsoft Store (Year: 2016).*

Bagling, "Navigating to real life objects in indoor environments using an Augmented Reality headset", Umea University Department of Computing Science, May 22, 2017 (Year: 2017).*

* cited by examiner

OBJECT ASSOCIATION DETERMINATION

BACKGROUND

Advances in technology have provided users with an enhanced ability to visualize and/or interact with virtual objects using augmented reality ("AR") or virtual reality ("VR") software disposed on information handling devices ("devices"), for example smart phones, tablet devices, AR/VR enabled wearable headsets, and the like. AR/VR enabled devices may include text recognition software that is capable of recognizing words or phrases in an image (e.g., static image, video image, etc.) and performing an augmented effect on the word or associated object (e.g., highlighting the word, etc.).

BRIEF SUMMARY

In summary, one aspect provides a method, comprising: receiving, at an information handling device, user command input comprising identification of an object; receiving, at an information handling device, image input comprising at least one object; determining, using a processor, whether the object in the user command input is associated with the at least one object in the image input; and responsive to determining that the object in the user command input is associated with the at least one object, performing a function based on the determination.

Another aspect provides an information handling device, comprising: a processor; a memory device that stores instructions executable by the processor to: receive user command input comprising identification of an objection; receive image input comprising at least one object; determine whether the object in the user command input is associated with the at least one object in the image input; and responsive to determining that the object in the user command input is associated with the at least one object, perform a function based on the determination.

A further aspect provides a product, comprising: a storage device that stores code, the code being executable by a processor and comprising: code that receives user command input comprising identification of an object; code that receives image input comprising at least one object; code that determines whether the object in the user command input is associated with the at least one object in the image input; and code that performs, responsive to determining that the object in the user command input is associated with the at least one object, a function based on the determination.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently encounter situations where an overwhelming amount of information is available to them at once. For example, a driver of a car looking for a parking sign may see a plurality of other street signs. The presence of these additional signs may make it difficult for the driver to find the particular sign they are looking for. As another example, a user may be allergic to a particular ingredient. If the user checks an ingredient label of a particular food source they may not be able to easily find the allergy causing ingredient because a plurality of other ingredients are also displayed on the label. Additionally, some ingredients can be listed under other names and the user may not know all the different names the ingredient can be called.

Users also frequently encounter situations where the information they are looking for is available but presented in an unfamiliar form. For example, an object (e.g., word, image, physical object, etc.) a user is looking for may be presently available but displayed in a language the user is not capable of understanding. As another example, a user may know one form of an object but only a synonymous version of the object is available (e.g., a user may be looking for a "bathroom" but the only signage indicates the presence of a "water closet", which the user does not realize is synonymous with "bathroom", etc.).

Conventionally, a device disposed with an augmented reality ("AR") text recognition program may be used to capture an image (e.g., static image, video image, etc.) of a scene and thereafter highlight a portion of the image if a desired word is identified in the scene. These programs comprise a whitelist of high frequency words (e.g., "stop", "go", etc.) that may be used as a comparison source for any words found in the captured image. However, the whitelist in these existing solutions is static and not capable of being dynamically updated based upon additionally received input, for example, voice input, mechanical input, and the like. Additionally, existing solutions are not capable of identifying synonyms, or different language equivalents, for a desired word. Furthermore, current solutions are unable to identify object-based equivalents, which are objects that may take different forms but represent the same underlying purpose. For example, a conventionally shaped sign in one country indicating a hospital may take a different conventional shape in another country, but would indicate the same thing.

Accordingly, an embodiment provides a method for determining whether an object present in user command input is associated with at least one object present in received image input. In an embodiment, user command input may be received at a device. The user command input may comprise a command to identify an object (e.g., "where is the bathroom sign", etc.). An embodiment may receive image input (e.g., static image input, video image input, etc.) comprising at least one object (e.g., an image containing a plurality of different signs, etc.). An embodiment may then determine whether the object in the command input is associated with an object in the image input (e.g., are any of the signs in the captured image representative of a bathroom, etc.). Responsive to determining an association, an embodiment may perform a function (e.g., highlight or outline the associated object in the captured image, etc.). Such a method may enable users to quickly identify objects present in their surroundings, regardless of whether the object is portrayed in a different language or presented in a form the user may not be familiar with.

The illustrated example embodiments will be best understood by reference to the figures. The following description is intended only by way of example, and simply illustrates certain example embodiments.

Figure 1:
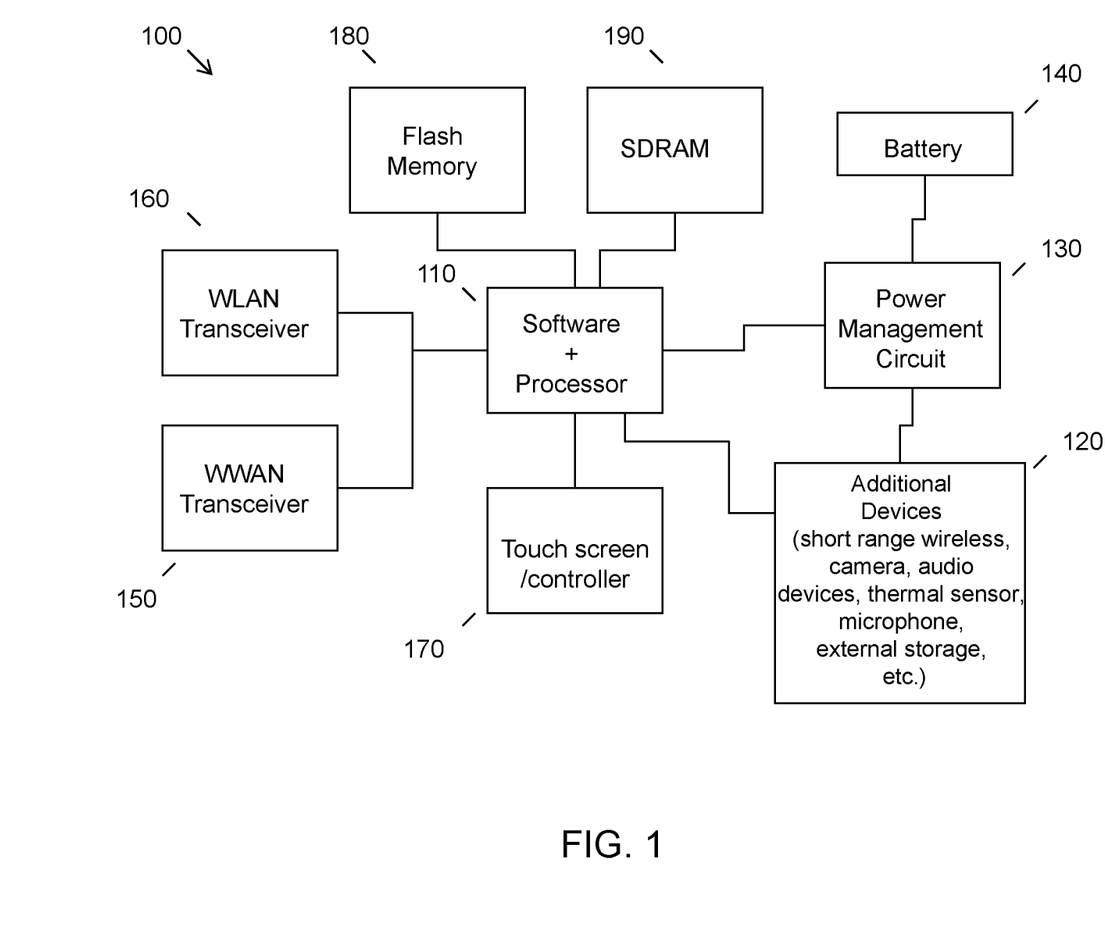
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
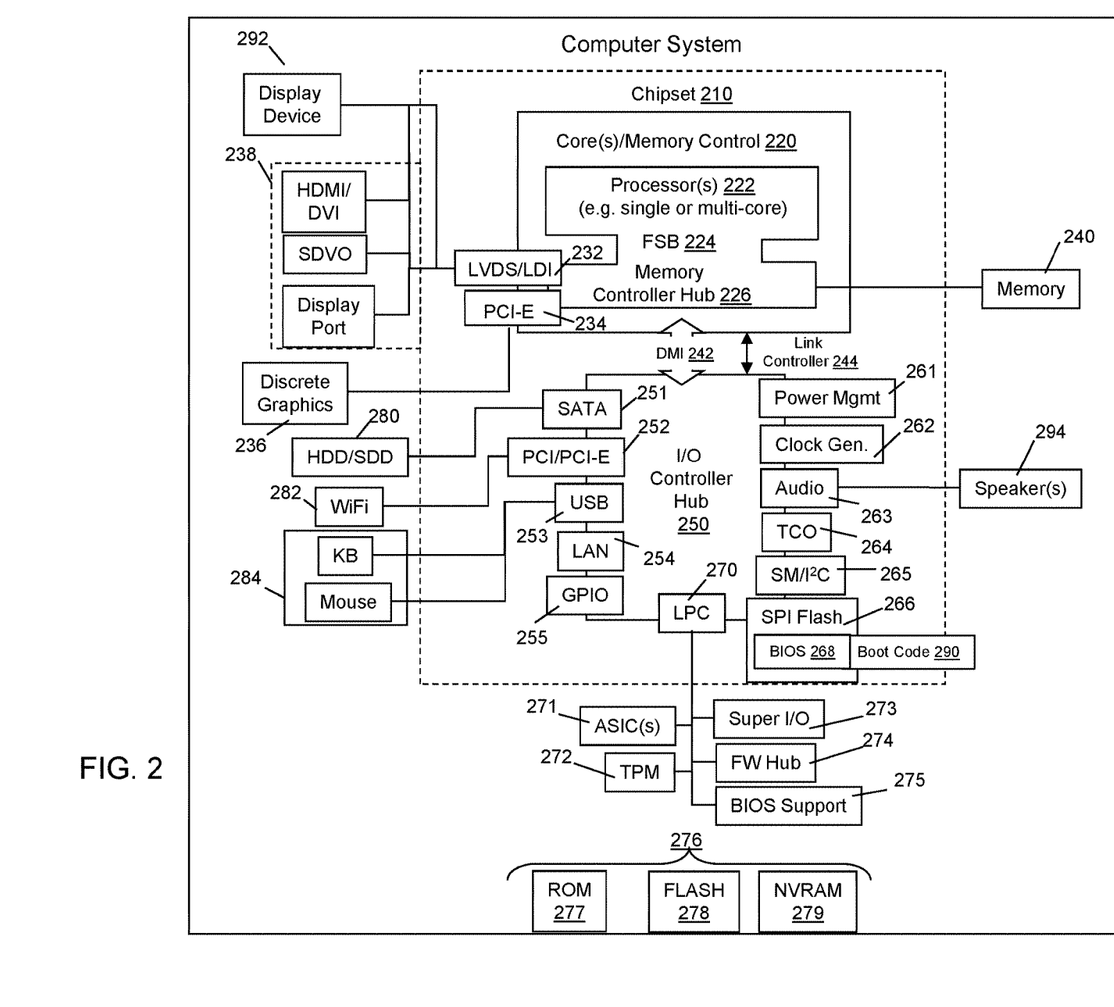
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, AR enabled headsets, personal computer devices generally, and/or electronic devices which may include image capturing capabilities that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
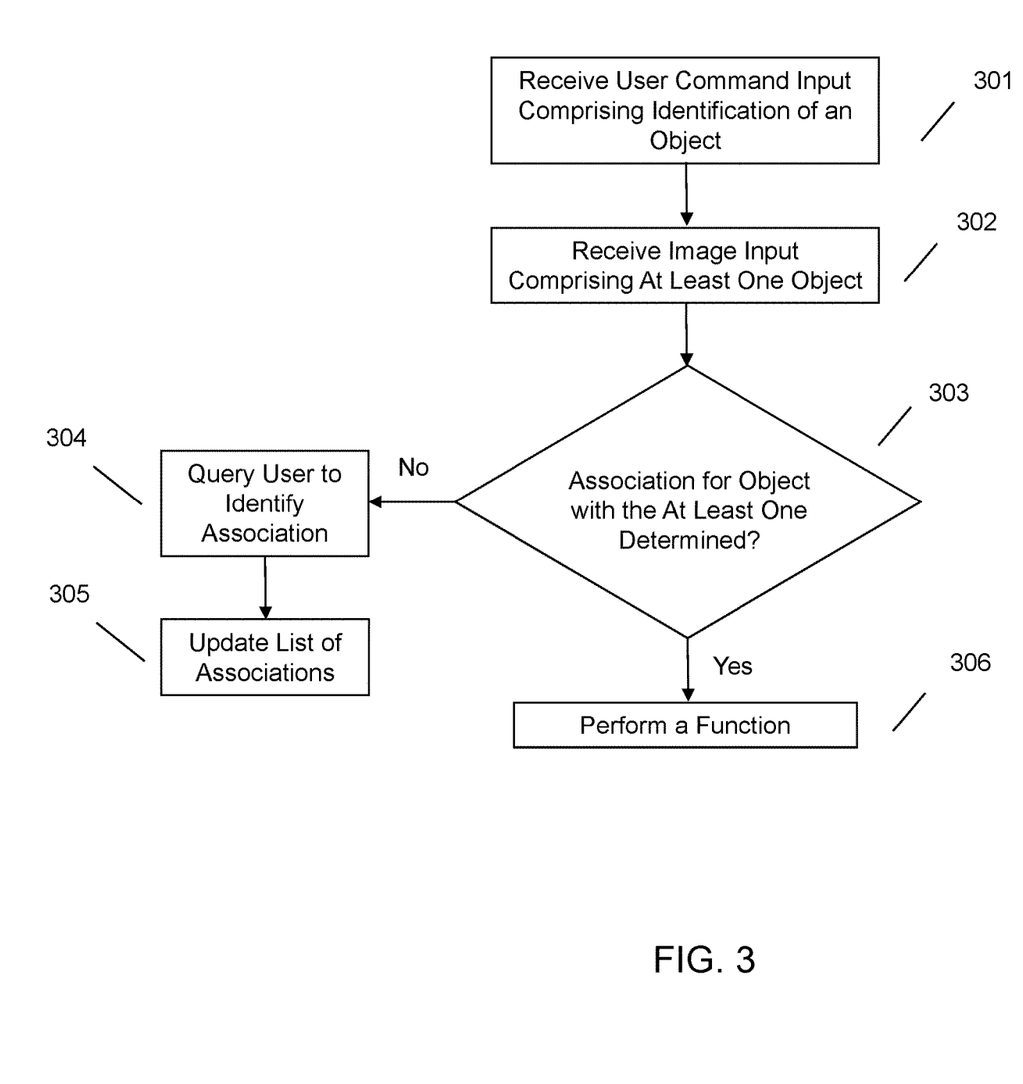
FIG. 3 illustrates an example method of determining whether an object in user command input is associated with an object in received image input.

Referring now to FIG. 3, an embodiment may perform a function responsive to determining that an object present in user command input is associated with an object present in received image input. At 301, an embodiment may receive user command input. The input may be received at an input device (e.g., physical keyboard, on-screen keyboard, audio capture device, image capture device, video capture device, digital assistant, etc.) and may be provided by any known method of providing input to an electronic device (e.g., touch input, text input, voice input, etc.). For simplicity purposes, the majority of the discussion herein will involve voice input that may be received at an input device (e.g., a microphone, a speech capture device, etc.) operatively coupled to a speech recognition device. However, it should be understood that generally any form of user input may be utilized.

In an embodiment, the input device may be an input device integral to the speech recognition device. For example, a smart phone may be disposed with a microphone capable of receiving voice input data. Alternatively, the input device may be disposed on another device and may transmit received voice input data to the speech recognition device. For example, voice input may be received at a smart speaker that may subsequently transmit the voice data to another device (e.g., to a user's smartphone for processing, etc.). Voice input data may be communicated from other sources to the speech recognition device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the input device may be configured to continuously receive voice input data by maintaining the input device in an active state. The input device may, for example, continuously detect voice input data even when other sensors (e.g., cameras, light sensors, speakers, other microphones, etc.) associated with the speech recognition device are inactive. Alternatively, the input device may remain in an active state for a predetermined amount of time (e.g., 30 minutes, 1 hour, 2 hours, etc.). Subsequent to not receiving any voice input data during this predetermined time window, an embodiment may switch the input device to a power off state. The predetermined time window may be preconfigured by a manufacturer or, alternatively, may be configured and set by one or more users. In an embodiment, the input device may initiate and remain active for as long as an underlying application associated with the input device is active (e.g., a microphone may remain active as long as an AR text recognition application is active, etc.).

In an embodiment, the user command input may comprise input requesting identification of an object. The object may be a word or a sign that is representative of virtually any person, place, or thing. For example, a user may provide the command input "where is the bathroom?" in which the word "bathroom" is the object that is representative of a location. In an embodiment, the user command input may simply comprise the name of the object without any other additional words. For example, a user may provide the command input containing only the word "penicillin", in which "penicillin" acts as not only the object to be identified but also as the command to identify. In an embodiment, the object requested to be identified may be one object cluttered among a plurality of other similar objects. For example, a user may wish to identify whether a particular ingredient is present on a food label, where the food label contains over a dozen different ingredients positioned close together. An embodiment may be able to determine whether a user-requested ingredient is present among the plurality of other ingredients.

At 302, an embodiment may receive image input comprising at least one object. The object in the image data may be virtually any object such as a word, a sign, a combination thereof, etc. In an embodiment, the image may be a static image (e.g., picture, etc.), moving image (e.g., video, etc.), a combination thereof, and the like. The image may be captured by an image capture device (e.g., camera, video camera, virtual reality headset, etc.) that is integrally or remotely connected to the device. In the case of remote connection, an embodiment may transmit captured images to the device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

At 303, an embodiment may determine whether an object requested to be identified is present in the image input. In an embodiment, the determination may involve accessing an integral or remote data store comprising a list of associations for the object in the user command input. In an embodiment, the list of associations may be related to a list of different language associations for the object. For example, for the English word "Stop" the list may contain a multitude of associated words in different languages such as "Detener" in Spanish, "Arrêtez" in French, "Halt" in German, and the like. In another embodiment, the list of associations may be related to a list of synonyms, or closely related words, associated with the object. For example, for the word "bathroom", the list may contain a multitude of known synonyms such as "toilet", "restroom", "water closet", and the like. In yet another embodiment, the list of associations may be a list of objects that are shaped differently but represent the same meaning as the object to be identified. For example, in Country A, a hospital sign may be portrayed as a blue rectangle with a large "H" enclosed within whereas in Country B the hospital sign may be portrayed as a white rectangle with an enclosed illustration of a bed positioned underneath a red cross. In the list of associations, both of these signs may be associated with a hospital.

In an embodiment, the determination may involve comparing all of the words or objects in the list of associations against the objects in the captured image input to identify a match. For example, a user traveling abroad in Spain may provide the command input "which sign tells me to stop?" An embodiment may capture an image of the surrounding area and compare any identified objects with the stored Spanish association for the English word "stop" (i.e., Detener). In another example, a user may provide the command input "where is the bathroom?" An embodiment may capture an image of the surrounding area and compare any identified objects with the stored synonyms for the word "bathroom" (i.e., rest room, toilet, water closet, etc.). In yet another example, a user may provide the command input "where is the hospital?" An embodiment may capture an image of the surrounding area to determine whether any objects in the image match any of the stored representations for a hospital.

Responsive to determining, at 303, that an object in the user command input is associated with at least one object in the image input, an embodiment may perform, at 306, a function. In one embodiment the function may include performing a function on a display device. For example, if a user is using a mobile device (e.g., smart phone, tablet, laptop computer, mobile phone etc.) an embodiment may display the previously received image and then perform a function on the image on the display device. As another example, if a user is using a virtual reality or augmented reality headset, an embodiment may perform the function on the display associated with the headset.

In an embodiment, the function may comprise a highlighting function in which at least a portion of the associated object in the image input is visually distinguished from the non-associated objects (e.g., by changing the color of an area around the associated object, zooming in on the associated object, darken areas associated with non-associated objects, overlaying an image on the displayed image, etc.). For example, a user looking for aspirin may look at a medicine label of a particular drug to see if it contains aspirin. Responsive to receiving the user command input "does this have aspirin?" an embodiment may capture an image of a label and compare the listed ingredients against the word aspirin or any synonymous names thereof (e.g., acetylsalicylic acid). Responsive to determining that aspirin is one of the listed drugs, an embodiment may highlight the portion of the label where aspirin is displayed (e.g., highlight the word "aspirin", highlight the word "acetylsalicylic acid", circle the word, etc.). As another example, an embodiment may overlay an image on the received image. For example, an embodiment may display red Xs over the bottles that do not include aspirin. Such embodiments may help a user quickly identify, for example, the presence of a particular object among a clutter of other objects.

Responsive to not determining, at 303, an association between an object in the user command input and at least one object in the image input, an embodiment may query, at 304, a user to identify an association. For example, an embodiment may provide the audible query "do any objects on the screen relate to your command?" In an embodiment, the speech recognition device, or another device associated with the speech recognition device, may provide the query output to a user. The output may be audio output, visual output, a combination thereof, or the like. In an embodiment, the audible output may be provided through a speaker, another output device, and the like. In an embodiment, the visual output may be provided through a display screen, another display device, and the like. In an embodiment, the output device may be integral to the speech recognition device or may be located on another device. In the case of the latter, the output device may be connected via a wireless or wired connection to the speech recognition device. For example, a smart phone may provide instructions to provide audible output through an operatively coupled smart speaker.

Responsive to providing the query output, an embodiment may receive subsequent user input. The subsequent user input may comprise a user-provided association for the object in the command input and at least one object in the image input. For example, a user may examine the captured image input and select (e.g., using touch input, voice input, text input, etc.) a word or an object that the user believes is representative of the object in the command input (e.g., a user may select a particular sign that they feel is representative of a "bathroom", etc.). Responsive to receiving the subsequent user input, an embodiment may dynamically update, at 305, the list of associations based on the subsequent input and may thereafter identify the object responsive to receiving a corresponding command input to do the same.

The various embodiments described herein thus represent a technical improvement to conventional object recognition techniques. Using the techniques described herein, an embodiment may receive user command input and image input to determine whether an object in the user command input is associated with at least one object in the image input. Responsive to receiving a positive determination, an embodiment may perform a corresponding function (e.g., highlight a portion of the image input object, etc.). Such techniques enable users to quickly identify a desired object situated among a plurality of other objects, regardless of whether the other objects are presented in a different language or in another form the user is not familiar with.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at an information handling device of an augmented reality system and from another device operatively coupled to the information handling device, user command input requesting identification of an object within a viewing field of the user, wherein the command input comprises a first term associated with the object;
    receiving, at an information handling device, image input comprising a plurality of physical objects within the viewing field;
    determining, using a processor, that the object requested to be identified in the user command input corresponds to at least one physical object in the image input, wherein the determining comprises determining that the first term is not contained within the image input and a second term associated with the object and synonymous with and different from the first term is included in the image input and the at least one physical object within the image input corresponds to the second term, wherein determining the second term is identified as synonymous with the first term by accessing a data store comprising a list of associations of the object, wherein the list of associations comprise terms having the same meaning and being updated at least in part based upon received user input; and
    performing a function on the at least one physical object in the image input displayed on a display device of the augmented reality system and coupled to the information handling device based on the determination, wherein performing the function comprises visually distinguishing the physical object from the remaining plurality of other physical objects included in the image input by augmenting the image input of the at least one physical object with a virtual object corresponding to the performed function.

2. The method of claim 1, wherein the object is at least one of a word and a sign.

3. The method of claim 1, wherein the at least one object comprises a plurality of objects and wherein the determining comprises identifying one of the plurality of objects that is associated with the object in the user command input.

4. The method of claim 3, wherein the function comprises highlighting the one of the plurality of objects.

5. The method of claim 1, wherein the list of associations comprises a list of different language associations.

6. The method of claim 5, wherein the user command input is provided in a first language and the at least one object is portrayed in a second language different from the first language.

7. The method of claim 1, wherein the list of associations comprises a list of synonym associations.

8. The method of claim 7, wherein the object in the user command input is identified by at least one first word and the at least one object is portrayed by at least one second word different from the at least one first word.

9. An information handling device of an augmented reality system, comprising:
    a processor;
    a memory device that stores instructions executable by the processor to:
    receive, from another device operatively coupled to an information handling device, user command input requesting identification of an object within a viewing field of the user, wherein the command input comprises a first term associated with the object;
    receive image input comprising a plurality of physical objects within the viewing field;
    determine that the object requested to be identified in the user command input corresponds to at least one physical object in the image input, wherein the determining comprises determining that the first term is not contained within the image input and a second term associated with the object and synonymous with and different from the first term is included in the image input and the at least one physical object within the image input corresponds to the second term, wherein determining the second term is identified as synonymous with the first term by accessing a data store comprising a list of associations of the object, wherein the list of associations comprise terms having the same meaning and being updated at least in part based upon received user input; and
    perform a function on the at least one physical object in the image input displayed on a display device of the augmented reality system and coupled to the information handling device based on the determination, wherein to perform the function comprises to visually distinguish the physical object from the remaining plurality of other physical objects included in the image input by augmenting the image input of the at least one physical object with a virtual object corresponding to the performed function.

10. The information handling device of claim 9, wherein the object is at least one of a word or and a sign.

11. The information handling device of claim 9, wherein the at least one object comprises a plurality of objects and wherein the instructions executable by the processor to determine comprise instructions executable by the processor to identify one of the plurality of objects that is associated with the object in the user command input.

12. The information handling device of claim 11, wherein the function comprises instructions executable by the processor to highlight the one of the plurality of objects.

13. The information handling device of claim 9, wherein the list of associations comprises a list of different language associations.

14. The information handling device of claim 13, wherein the user command input is provided in a first language and the at least one object is portrayed in a second language different from the first language.

15. The information handling device of claim 9, wherein the list of associations comprises a list of synonym associations.

16. The information handling device of claim 15, wherein the object in the user command input is identified by at least one first word and the at least one object is portrayed by at least one second word different from the at least one first word.

17. A product utilized in an augmented reality system, comprising:

a storage device that stores code, the code being executable by a processor and comprising:

code that receives, from another device operatively coupled to an information handling device, user command input requesting identification of an object within a viewing field of the user, wherein the command input comprises a first term associated with the object;

code that receives image input comprising a plurality of physical objects within the viewing field;

code that determines that the object requested to be identified in the user command input corresponds to at least one physical object in the image input, wherein the determining comprises determining that the first term is not contained within the image input and a second term associated with the object and synonymous with and different from the first term is included in the image input and the at least one physical object within the image input corresponds to the second term, wherein determining the second term is identified as synonymous with the first term by accessing a data store comprising a list of associations of the object, wherein the list of associations comprise terms having the same meaning and being updated at least in part based upon received user input; and code that performs a function on the at least one physical object in the image input displayed a display device of the augmented reality system and coupled to the information handling device of the augmented reality system based on the determination, wherein the code that performs the function comprises code that visually distinguishes the physical object from the remaining plurality of other physical objects included in the image input by augmenting the image input of the at least one physical object with a virtual object corresponding to the performed function.

\* \* \* \* \*